United States Patent
Shin et al.

(10) Patent No.: US 8,181,198 B2
(45) Date of Patent: May 15, 2012

(54) BROADCAST RECEIVING APPARATUS AND METHOD FOR PROVIDING WIDGET SERVICE THEREOF VIA AVAILABLE CHANNEL OR VIRTUAL CHANNEL

(75) Inventors: Seung-chul Shin, Gangneung-si (KR); Jin-ho Yim, Suwon-si (KR); Sang-gon Song, Daegu (KR); Jong-chan Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 12/476,292

(22) Filed: Jun. 2, 2009

(65) Prior Publication Data

US 2010/0017825 A1     Jan. 21, 2010

(30) Foreign Application Priority Data

Jul. 21, 2008 (KR) .................... 10-2008-0070846
Oct. 21, 2008 (KR) .................... 10-2008-0103337

(51) Int. Cl.
*G06F 3/00* (2006.01)
*G06F 13/00* (2006.01)
*H04N 5/445* (2011.01)
*G06F 3/048* (2006.01)
*H04N 5/50* (2006.01)

(52) U.S. Cl. .......... 725/38; 725/45; 725/56; 725/53; 725/51; 715/763; 715/810; 715/835; 348/570

(58) Field of Classification Search ............ 725/38, 725/45, 56, 53, 51; 715/763, 810, 835; 348/570
See application file for complete search history.

(56) References Cited

U.S. PATENT DOCUMENTS

| | | | |
|---|---|---|---|
| 2007/0283391 A1* | 12/2007 | Connelly et al. | 725/44 |
| 2008/0307456 A1* | 12/2008 | Beetcher et al. | 725/38 |
| 2009/0111448 A1* | 4/2009 | Paila | 455/418 |
| 2009/0222757 A1* | 9/2009 | Gupta et al. | 715/776 |

FOREIGN PATENT DOCUMENTS

KR    10-2008-0001326 A    1/2008

* cited by examiner

*Primary Examiner* — Hoang-Vu A Nguyen-Ba
(74) *Attorney, Agent, or Firm* — Sughrue Mion, PLLC

(57) ABSTRACT

A method for providing a widget service using a media service providing apparatus is provided. A method for providing the widget service includes operations of scanning channels providing media services therethrough; determining whether or not there is an available channel among the scanned channels for allocating a widget service; if it is determined that there is the available channel, allocating the widget service to the available channel; and providing the widget service allocated to the available channel. Accordingly, a widget service is provided without disturbing a user viewing a television (TV), increasing user convenience.

46 Claims, 12 Drawing Sheets

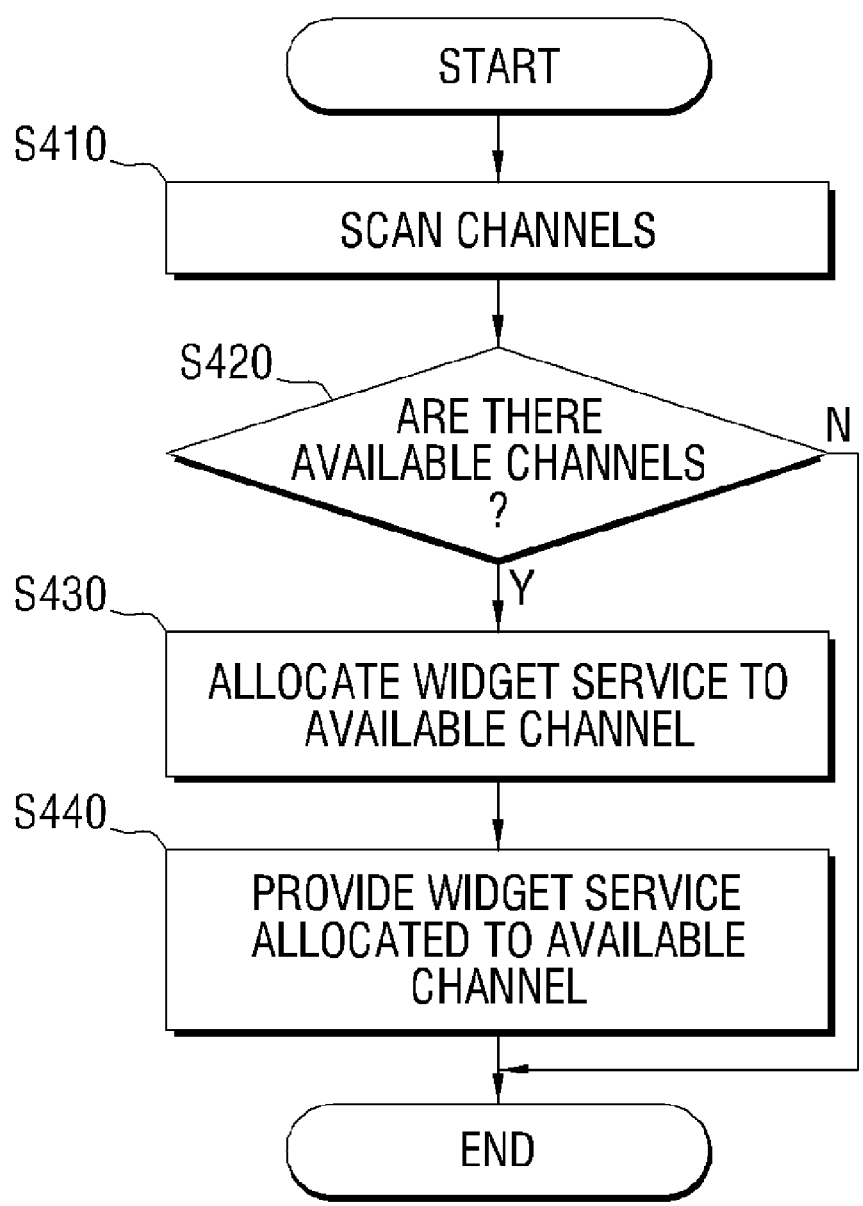

BROADCAST RECEIVING APPARATUS AND METHOD FOR PROVIDING WIDGET SERVICE THEREOF VIA AVAILABLE CHANNEL OR VIRTUAL CHANNEL

CROSS-REFERENCE TO RELATED APPLICATIONS

This application claims priority under 35 U.S.C. §119 from Korean Patent Application Nos. 10-2008-0070846 and 10-2008-0103337, filed on Jul. 21, 2008 and Oct. 21, 2008, in the Korean Intellectual Property Office, the disclosures of which are incorporated herein by reference in its entirety.

BACKGROUND OF THE INVENTION

1. Field of the Invention

Apparatuses and methods consistent with the present invention relate to a media service providing apparatus and a method for providing a widget service, and more particularly, to a media service providing apparatus which provides a widget service and a method for providing a widget service using the media service providing apparatus.

2. Description of the Related Art

Web acceptance models of an Internet Protocol Television (IPTV) include an open web method, in which information is received in the form of a web page from a service provider, a digital television (TV) portal method, in which an IPTV-based web service is provided to a user through a cooperation between an IPTV provider and a service provider, and a widget method, in which a content is received only from a service provider and displayed on a small window. Among these, the most widely applicable web acceptance model is a widget method, which is capable of providing multi-tasking such as simultaneously providing television viewing and a widget service, and a direct management although a user is not necessarily a widget service provider.

Widgets or gadgets are miniature applications in which frequently used services are produced as icons, and may be operated independently. By executing a widget, it is possible to provide a content or operate an application program such as a clock independently without opening a web browser.

Unlike PC-based widgets, which can be operated using a keyboard or a mouse, or mobile-based widgets which can be operated using a stylus pen or a touch screen, TV-based widgets are limited in terms of interaction, since a user must select desired menus by manipulating a remote controller.

More particularly, a user who has a previous version of a TV-based widget may experience inconvenience since the user needs to manipulate direction keys on a remote controller to change from a main menu to a sub menu. Also as the previous version of a TV-based widget displays a widget window on a part of a screen, the widget window may disturb a user viewing TV.

Moreover, it takes seconds, sometimes minutes for a user to check information such as weather, news, and traffic provided by the widget window. Accordingly, it is inappropriate for a widget window to be displayed on the part of a TV screen since the widget window may disturb a user viewing TV.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a media service providing apparatus which provides a widget service without covering a screen of a display by allocating the widget service to a channel of the TV and a method for providing a widget service.

According to an aspect of the present invention, there is provided a method for providing a widget service of a media service providing apparatus, including scanning channels; determining whether or not there is an available channel among the scanned channels; if it is determined that there is an available channels, allocating a widget service to the available channel; and providing the widget service allocated to the available channel.

The method may further include if it is determined that there is no available channel, generating a virtual channel and allocating the widget service to the virtual channel.

The method may further include displaying at least one or more widget services on a display screen, wherein the scanning operation comprises scanning channels if one of the widget service is selected.

The method may further include if it is determined that there is at least one available channel, displaying a list of scanned channels, wherein the allocating operation comprises allocating the widget service to a channel selected from the list.

The scanning operation may include scanning the channels according to at least one of a general mode, a cable mode, a digital television (TV) mode, and a widget mode.

The scanning operation may include scanning the channels whenever an event occurs or at given time intervals.

The allocating operation may include automatically allocating a widget service to each available channel according to a given method.

The method may further include if a widget service is allocated to the available channel, storing information on mapping between the channel and the widget service.

The providing operation may include if an event occurs while a general media service is provided over a general channel, changing the general channel to a specific widget channel and providing a widget service; and if the event is finished, changing the specific widget channel to the general channel and providing the general media service.

The predetermined event may include an event in which a commercial broadcast is displayed while the general media service is provided.

The method may further include at a time preset using an electronic program guide (EPG), changing a widget channel to a general channel or changing a general channel to a widget channel.

The method may further include registering the provided widget service to a specific channel or deleting the provided widget service from the specific channel according to manipulation of a registration or deletion key of a remote controller.

The providing operation may include displaying a channel number of a widget channel and a channel number of a general channel using different colors on an area of the display screen; and providing the widget service.

The method may further include generating a preferred channel among widget channels or among widget channels and general channels.

According to another aspect of the present invention, there is provided a method for providing a widget service of a broadcast receiving apparatus, including if an event occurs while a general media service is provided over a general channel, changing the general channel to a specific widget channel and providing a widget service; and if the event is finished, changing the specific widget channel to the general channel and providing the general media service.

The method may further include registering information regarding a channel to which a widget service is allocated to an EPG.

The predetermined event may include an event in which a commercial broadcast is displayed while the general media service is provided.

The predetermined event may include an event in which a time preset through an EPG arrives.

According to still another aspect of the present invention, there is provided media service providing apparatus, including a scanning unit which scans channels; a determination unit which determines whether or not there is an available channel among the scanned channels; a controlling unit which allocates a widget service to the available channel and provides the widget service allocated to the available channel if it is determined that there is an available channel.

If it is determined that there is no available channel, the controlling unit may generate a virtual channel and allocate the widget service to the virtual channel.

The apparatus may further include a first display unit which displays at least one widget list on a display screen, wherein if one of the widget lists is selected, the scanning unit scans channels.

The apparatus may further include a second display unit which displays a list of scanned channels, if it is determined that there is at least one available channel, wherein the controlling unit allocates the widget service to a channel selected from the list.

The scanning unit may scan the channels according to one of a general mode, a cable mode, a digital TV mode, and a widget mode.

The scanning unit may scan the channels whenever an event occurs or at given time intervals.

The controlling unit may automatically allocate a widget service to each available channel according to a given method.

The broadcast receiving apparatus may further include a storage unit which stores information on mapping between the channel and the widget service if a widget service is allocated to the available channel.

If an event occurs while a general media service is provided over a general channel, the controlling unit may change the general channel to a specific widget channel and provide a widget service; and if the event is finished, the controlling unit may change the specific widget channel to the general channel and provide the general media service.

The event may include an event in which a commercial broadcast is displayed while the general broadcast service is provided.

The event may include an event in which a time preset through an EPG arrives.

The controlling unit may register the provided widget service to a specific channel or deletes the provided widget service from the specific channel according to manipulation of a registration or deletion key of a remote controller.

The controlling unit may display a channel number of a widget channel and a channel number of a general channel using different colors on an area of the display screen and provides the widget service.

The apparatus may further include a preferred channel generation unit which generates a preferred channel among widget channels or among widget channels and general channels.

According to still another aspect of the present invention, there is provided a broadcast receiving apparatus, including a broadcast processing unit which tunes to a broadcast channel and provides a broadcast service; and a controlling unit which changes a general broadcast channel to a specific widget channel and provides a widget service if an event occurs while a general broadcast service is provided over the general broadcast channel, and the controlling unit changes the specific widget channel to the general broadcast channel and provides the general broadcast channel if the predetermined event is finished.

The broadcast processing unit may register information regarding a channel to which a widget service is allocated to an EPG.

The event may include an event in which a commercial broadcast is displayed while the general broadcast service is provided.

The event may include an event in which a time preset through an EPG arrives.

According to still another aspect of the present invention, there is provided a media service providing system, including a server which stores widget information; and a media service providing apparatus which allocates a widget service to an available channel and provides the widget service allocated to the available channel if the media service providing apparatus scans channels and determines that there is an available channel among the scanned channel.

The apparatus may scan the channels according to at least one of a general mode, a cable mode, a digital TV mode, and a widget mode.

The apparatus may scan the channels whenever an event occurs or at given time intervals.

The apparatus may generate a virtual channel and allocate a widget service to the virtual channel if it is determined that there is no available channel.

If an event occurs while a general media service is provided over a general channel, the apparatus may change the general channel to a specific widget channel and provide a widget service; and if the event is finished, the apparatus may change the specific widget channel to the general channel and provide the general media service.

The event may include an event in which a commercial broadcast is displayed while the general broadcast service is provided.

The event may include an event in which a time preset through an EPG arrives.

The apparatus may register the provided widget service to a specific channel or delete the provided widget service from the specific channel according to manipulation of a registration or deletion key of a remote controller.

The apparatus may display a channel number of a widget channel and a channel number of a general channel using different colors on an area of a display screen and provide the widget service.

The apparatus may generate a preferred channel among widget channels or among widget channels and general channels.

BRIEF DESCRIPTION OF THE DRAWINGS

The above and/or other aspects of the present invention will be more apparent by describing exemplary embodiments of the present invention with reference to the accompanying drawings, in which:

FIG. 4 is a flowchart provided to explain a method for providing a widget service in a broadcast receiving apparatus, according to an exemplary embodiment of the present invention;

DETAILED DESCRIPTION OF EXEMPLARY EMBODIMENTS

Figure 1:
FIG. 1 is a block diagram illustrating a broadcast receiving apparatus according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram illustrating a broadcast receiving apparatus according to an exemplary embodiment of the present invention. Referring to FIG. 1, a broadcast receiving apparatus 100 according to an exemplary embodiment of the present invention comprises a scanning unit 110, a determination unit 120, and a controlling unit 130. The scanning unit 110 scans channels. The determination unit 120 determines whether there are available channels among the scanned channels. If it is determined that there is an available channel, the controlling unit 130 allocates a widget service to the available channel so that the widget service may be provided.

The available channels may be empty channels among channels preset to the broadcast receiving apparatus 100, to which aerial broadcasts, cable broadcasts, digital television (TV) broadcasts, or other broadcasts known to the related art are not allocated. The scanning unit 110 may scan channels by changing the entire screen of a TV, or may scan available channels without disturbing a user viewing a TV by using a picture in picture (PIP) scheme.

The scanning unit 110 may scan available channels if a channel scanning event occurs by manipulating direction keys or an OK key on a remote controller. For instance, the event may be an event for selecting a widget list displayed on a screen. The scanning unit 110 may scan available channels whenever the TV is turned on or at regular time intervals. The scanning unit 110 not only scans available channels, but also scans unavailable channels. The scanning unit 110 may be implemented using a tuner.

The scanning unit 110 may scan all of the available channels in all modes, including a general mode, a cable mode, a digital TV mode, and a widget mode. The general mode may be an aerial mode.

Alternatively, the scanning unit 110 may scan available channels in one of a general mode, a cable mode, a digital TV mode, and a widget mode. The broadcast receiving apparatus 100 may scan available channels corresponding to each mode.

If channels available in a general mode are scanned, and if a widget service is mapped to at least one of the channels available in the general mode, the widget service may be provided only in a general mode. Accordingly, a widget service is provided in a general mode together with an aerial broadcast.

If channels available in a widget mode are scanned, and if a widget service is mapped to at least one of the scanned available channels, the widget service is provided only in a widget mode. Accordingly, a widget mode is converted from another mode such as a general mode, a cable mode, or a digital TV mode, and thus a user may use a widget service provided in the widget mode.

If the scanning unit 110 scans available channels to which broadcast programs have already been allocated, the determination unit 120 determines whether there is a channel to which a widget service can be allocated.

If the determination unit 120 determines that there are available channels, the controlling unit 130 allocates a widget service to an available channel, and provides the widget service through the channel. If it is determined that there is no available channel, the controlling unit 130 generates a virtual channel, and allocates a widget service to the virtual channel. The process of allocating a widget service to a virtual channel will be explained below.

If an event occurs while a general broadcast service is provided over a general broadcast channel, the controlling unit 130 changes the general broadcast channel to a specific widget channel to provide a widget service corresponding to the event, and if the event is finished, the controlling unit 130 changes the specific widget channel to the general broadcast channel to provide the general broadcast service. If an event occurs, the widget service may also be provided through the specific widget channel which is changed from a channel over which a media stored in the broadcast receiving apparatus 100 is provided The widget channel means a channel to which a widget service is allocated, and a general broadcast channel means a channel to provide a broadcast such as an aerial broadcast, a cable broadcast, or a digital broadcast, and to which a widget service has not been allocated.

The event may be a commercial break in which a commercial broadcast is displayed while the general broadcast service is provided.

The event may occur after a given time period has elapsed. The event may be an event that occurs when a previously set time is reached. In this case, a user may set a starting time and a finishing time of the event. A starting time and a finishing time may be set using an electronic program guide (EPG). At a previously set time, a general broadcast channel may be changed to a widget broadcast channel, and if a given time period has elapsed, the widget broadcast channel may be changed back to a general broadcast channel.

The event may occur if a global news channel 61 is changed to a local news channel while a global news is broadcast over the global news channel 61.

For another example, if a movie "Batman" is broadcast over a movie channel 32, a commercial broadcast may be broadcast at a given time during the broadcast of the movie. In this case, if a stock news widget is allocated to channel number 27, a channel providing a general broadcast may be automatically changed to the stock news channel 27 during the commercial broadcast, and thus the stock news widget may be provided.

In this situation, a service allocated to each channel and to be provided may be pre-registered with an EPG so that a user recognizes a starting time and a finishing time of the event. Various information, such as a starting time and a finishing time of a specific program, the type of a commercial broadcast to be inserted, the time at which a commercial broadcast is inserted, the time at which a commercial broadcast is finished, the type of widget service to be inserted in place of a commercial broadcast, and a channel number to which a widget service is allocated, may be registered with the EPG.

As explained above, if an event occurs while a general broadcast service is provided, a current channel is converted to a widget channel to provide a widget service in this exemplary embodiment of the present invention. Alternatively, if an event occurs while a widget service is provided, a current channel providing the widget service is changed to another widget channel to provide another widget service corresponding to the event.

The controlling unit 130 may register a widget service for a specific channel or delete a widget service from a channel to which the widget service is allocated according to manipulation of a registration or deletion key on a remote controller. Since a widget service is allocated to a specific channel, the channel having the widget service may be deleted or registered according to manipulation of the remote controller in the same manner as in general broadcast channels.

If a user changes a channel, a channel number is generally displayed on an upper right portion of a screen. The controlling unit 130 may set the color of the channel number differently so that the color of a widget broadcast channel number is different from that of a general broadcast channel number such as an aerial broadcast, a cable broadcast, or a digital broadcast. Accordingly, the widget broadcast channel can be easily distinguished from a general broadcast channel.

The broadcast receiving apparatus 100 according to an exemplary embodiment of the present invention differs from a related art broadcast receiving apparatus providing a widget service on an area of a screen. That is, the broadcast receiving apparatus 100 allocates a widget service to a channel, and thus the widget service is provided on an entire screen. Accordingly, the problem that a widget service window hides part of a screen may be resolved.

Figure 2:
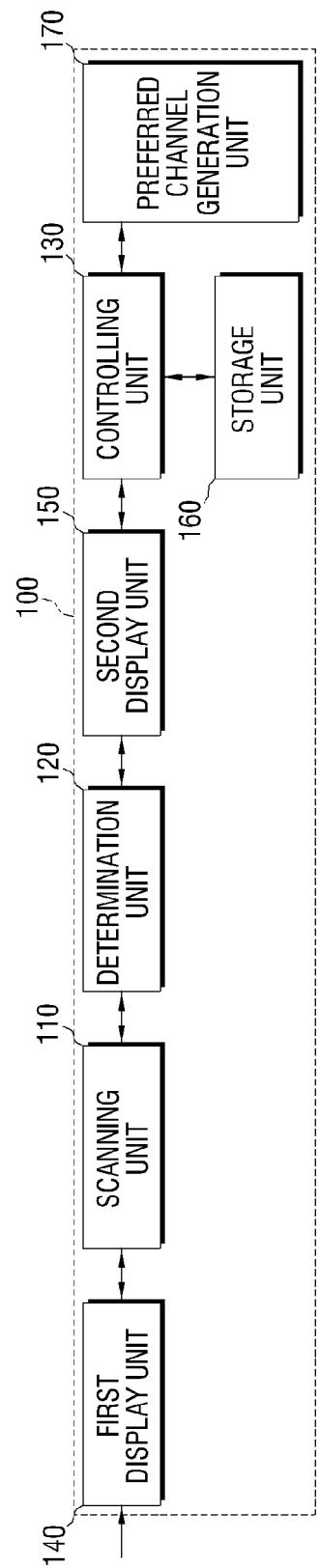
FIG. 2 is a detailed block diagram illustrating the broadcast receiving apparatus of FIG. 1, according to an exemplary embodiment of the present invention.

FIG. 2 is a detailed block diagram illustrating the broadcast receiving apparatus of FIG. 1. Referring to FIG. 2, the broadcast receiving apparatus 100 according to an exemplary embodiment of the present invention further comprises a first display unit 140, a second display unit 150, a storage unit 160, and a preferred channel generation unit 170 in addition to the scanning unit 110, the determination unit 120, and the controlling unit 130 in FIG. 1.

The first display unit 140 displays a widget list listing at least one widget according to received widget information. Once, a user selects one of the displayed widgets from the widget list displayed by the first display unit 140, the scanning unit 110 scans channels.

The widget information is provided from an external server or a hub site of the broadcast receiving apparatus 100, and may be information regarding the type, function, or popularity (the number of users who download the widget) of a widget. The widget information provided by the external server or the hub site may be transmitted to the broadcast receiving apparatus 100 through a network interface (not shown). The network interface may be implemented as a network interface card (NIC).

If the determination unit 120 determines that there is at least one available channel, the second display unit 150 may display a list of scanned channels. If a user selects a channel from the list of the scanned channels by manipulating a remote controller after the second display unit 150 displays the list of the scanned channels, the controlling unit 130 may allocate the selected widget service to the selected channel.

If a specific widget service is allocated to a channel, the storage unit 160 may store information on mapping between the widget service and the channel. For example, the storage unit 160 stores information that a weather widget is mapped with a channel 45 or information that a news flash widget is mapped with channel 72. Accordingly, if available channels are scanned later, the channels 45 and 72 are not searched as available channels since the channels 45 and 72 already have widget services allocated.

The broadcast receiving apparatus 100 according to another exemplary embodiment of the present invention may comprise the storage unit 160 to store widget information received from an external server, instead of directly receiving widget information from an external server as described above. In this situation, the first display unit 140 displays a widget list including at least one widget using the widget information stored in the storage unit 160.

The preferred channel generation unit 170 may generate a preferred channel either among widget broadcast channels or among widget broadcast channels and general broadcast channels. The preferred channel generation unit 170 may also generate a preferred channel among general broadcast channels. If the second display unit 150 displays a list of allowable channels, the preferred channel generation unit 170 generates a preferred channel at the same time as or after the controlling unit 130 allocates a widget service.

Figure 3A:
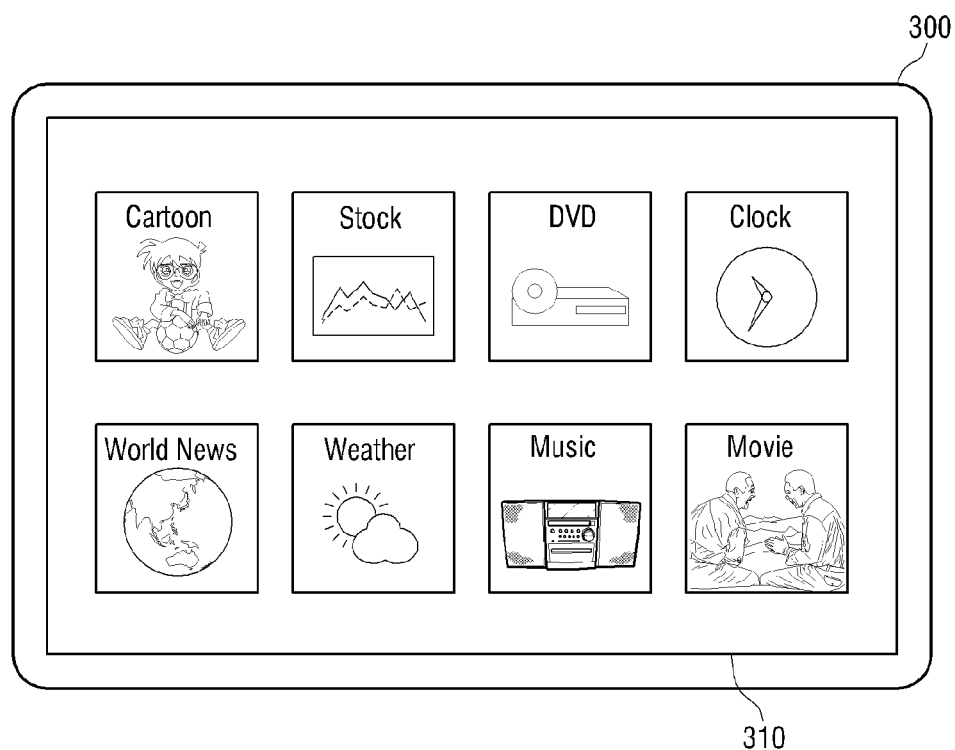
FIGS. 3A and 3B are views provided to explain a method for allocating a channel capable of being used in a broadcast receiving apparatus, according to an exemplary embodiment of the present invention.
Figure 3B:
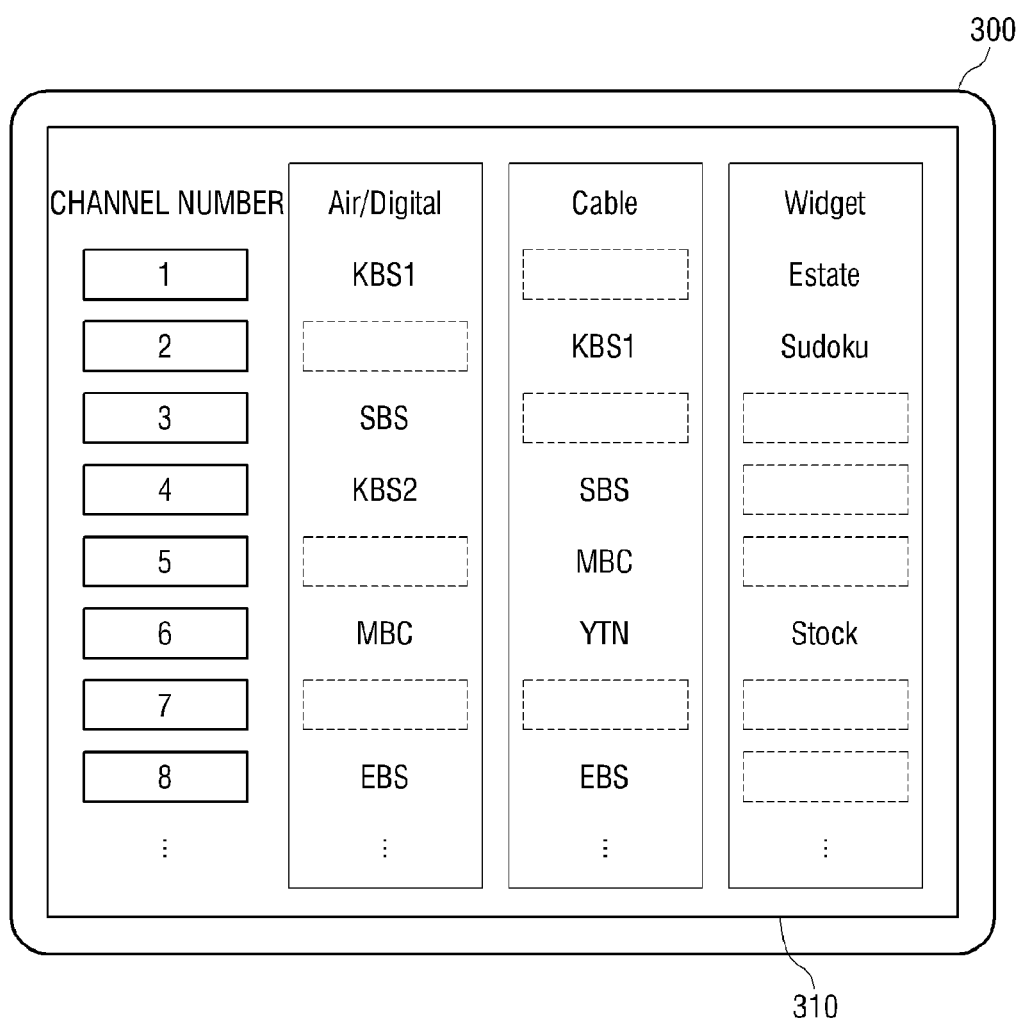

FIGS. 3A and 3B are views provided to explain a method for allocating a channel capable of being used in a broadcast receiving apparatus according to an exemplary embodiment of the present invention. Referring to FIG. 3A, at least one widget service is displayed on an area 310 of a screen 300. For example, a user selects a menu provided on an on-screen display (OSD) by manipulating a wheel key, direction keys, or an OK key of a remote controller so that a screen to provide a widget service may be displayed as shown in FIG. 3A.

If a user selects a specific widget, for example, a weather widget on the screen 300 of FIG. 3A, the state of each channel determined by the scanning unit 110, that is, whether or not a channel is available, is displayed on the screen 300 as shown in FIG. 3B. As an aerial broadcast is generally provided together with a digital TV broadcast in a general mode, the aerial broadcast and digital TV broadcast are illustrated together in this exemplary embodiment of the present invention. As the digital TV broadcast is on the rise recently, the aerial broadcast and the digital TV broadcast may be provided separately.

General broadcast receiving apparatuses include a general mode and a cable mode, but do not include a widget mode. In FIG. 3B, a widget mode is already set, and thus widget services have been allocated to channels 1, 2, and 6, respectively. Unlike the case illustrated in FIG. 3B, a broadcast mode includes only a general mode and a cable mode, and a widget mode is generated to allocate a widget service. In this situation, a widget mode of the same type as the general mode and the cable mode may be received from an external source. Alternatively, the widget mode may be generated internally or generated using an external input mode such as a digital versatile disc (DVD) mode.

FIG. 4 is a flowchart provided to explain a method for providing a widget service in a broadcast receiving apparatus according to an exemplary embodiment of the present invention. Referring to FIG. 4, the process of providing a widget service in a broadcast receiving apparatus according to an exemplary embodiment of the present invention comprises scanning channels (S410), and determining whether there are available channels (S420). If it is determined that there is an available channel (S420-Y), a widget service is allocated to an available channel (S430), and the widget service allocated to the available channel may be provided (S440). The method for providing a widget service in an automatic channel allocation mode and a manual channel allocation mode will be explained according to another exemplary embodiment of the present invention.

Figure 5:
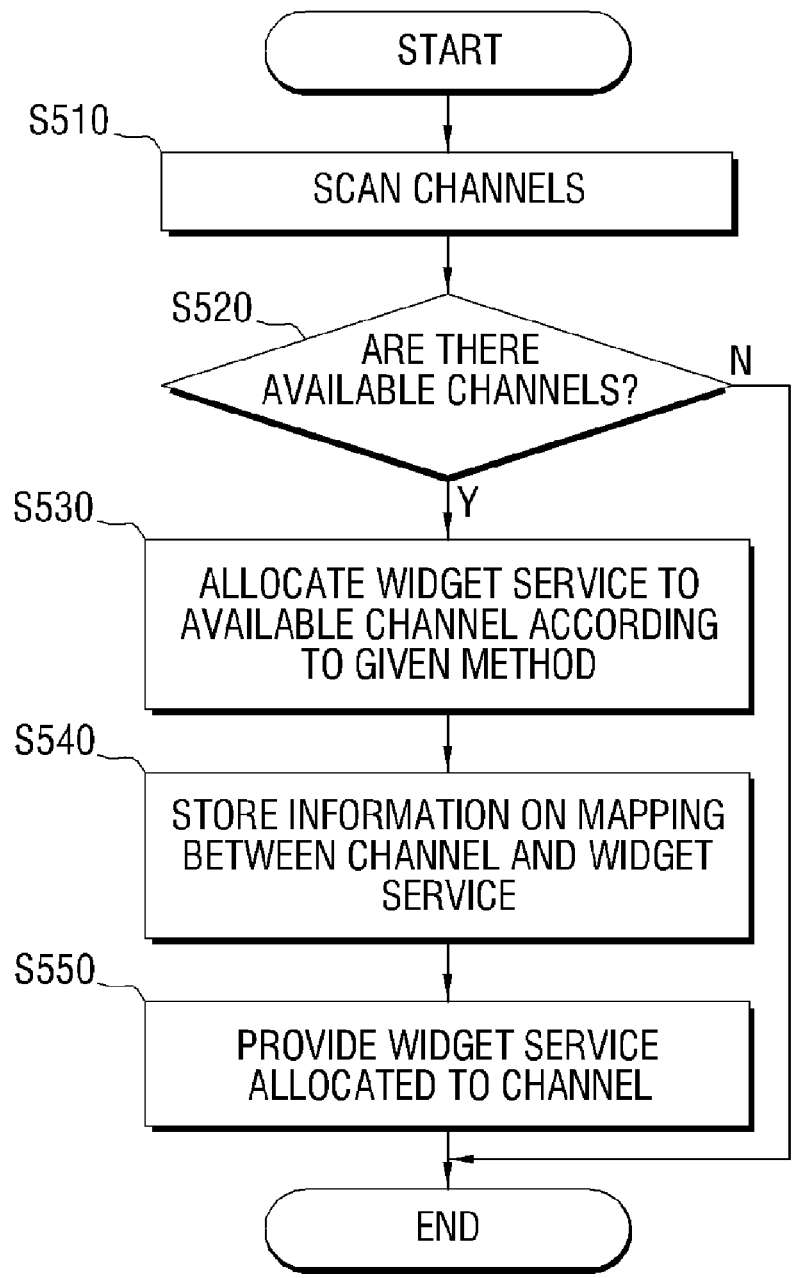
FIG. 5 is a flowchart provided to explain a method for providing a widget service in a broadcast receiving apparatus in an automatic channel allocation mode, according to an exemplary embodiment of the present invention.

FIG. 5 is a flowchart provided to explain a method for providing a widget service in a broadcast receiving apparatus in an automatic channel allocation mode. Referring to FIG. 5, the process of providing a widget service in a broadcast receiving apparatus in an automatic channel allocation mode comprises scanning channels (S510), and determining whether or not there is an available channel (S520). If it is determined that there is an available channel (S520-Y), a widget service is allocated to an available channel according to a given method (S530). The storage unit 160 stores information on mapping between the channel and the widget service (S540). Accordingly, the widget service allocated to the channel is provided (S550).

Operation S530 may also include an operation (not shown) of generating a preferred channel either among widget broadcast channels or among general broadcast channels and widget broadcast channels in addition to the above operation of allocating the widget service. Alternatively, the operation (not shown) of generating a preferred channel may be performed in any step after operation S530 is performed.

The order of operations S540 and S550 may be changed.

As described above, in the automatic channel allocation mode, if an event to scan available channels is received by manipulation of a remote controller, operations S510, S520-Y, S530, S540, and S550 are performed automatically, or operations S510, S520-N, and an ending operation are performed automatically. The automatic channel allocation mode is distinct from the manual channel allocation mode in that a virtual channel cannot be generated when there is no available channel.

Various methods for allocating a widget service to an available channel may be applied to the exemplary embodiment of the present invention as the above given method. For example, the priority order may be set for each broadcast mode. Widget services may be firstly allocated to available channels of a general mode, secondly, to available channels of a cable mode, and finally to available channels of a digital TV mode. Alternatively, widget services may be allocated to channels for each mode in an ascending order of channel number. As yet another example, widget services may be allocated to a channel adjacent to a channel which has similar characteristics in terms of service type. For instance, a news flash widget may be allocated to a channel adjacent to a news channel such as Cable News Network (CNN), and a widget providing movie information may be allocated to a movie channel such as Turner Classic Movies (TCM).

Figure 6:
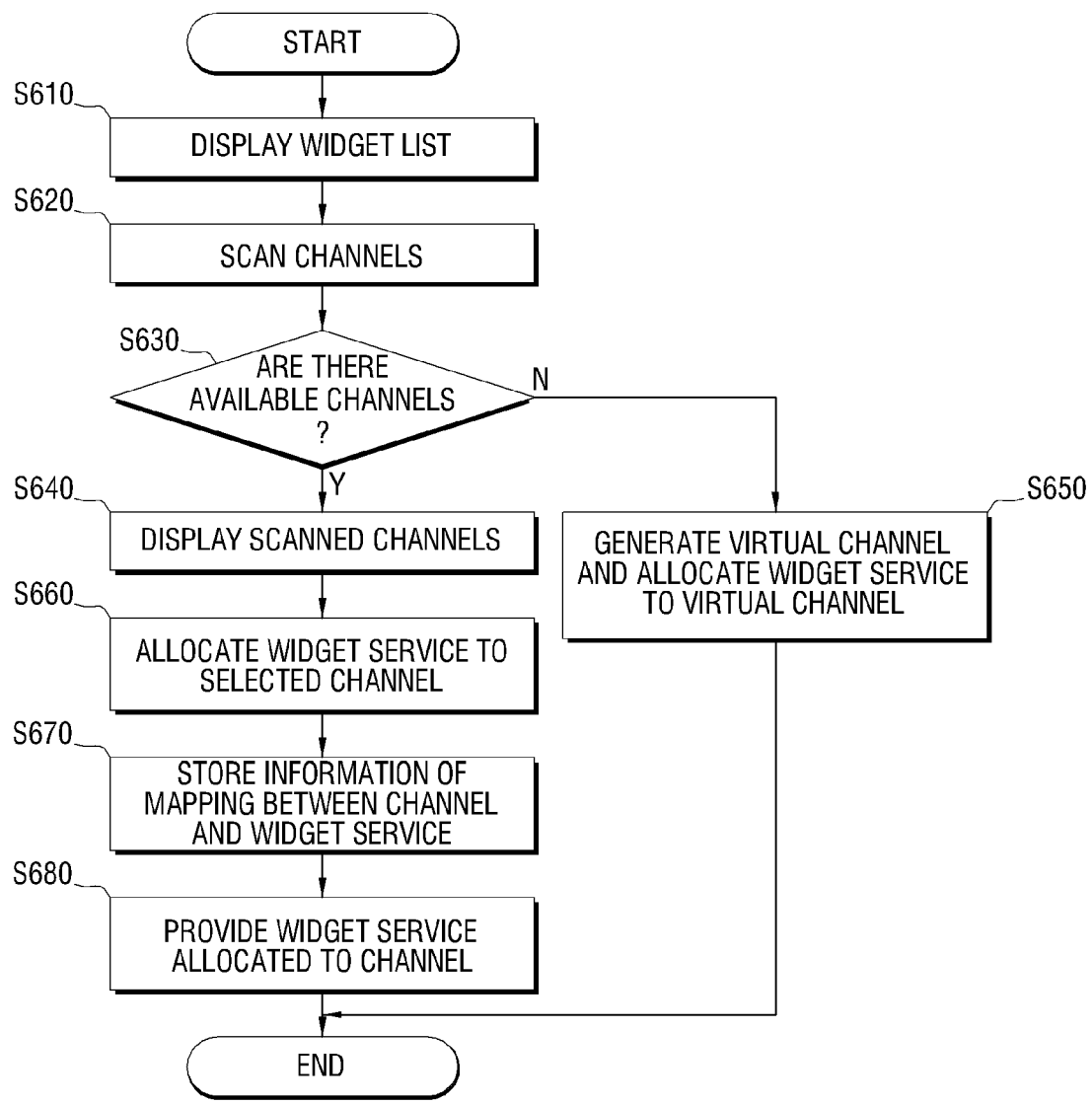
FIG. 6 is a flowchart provided to explain a method for providing a widget service in a broadcast receiving apparatus in a manual channel allocation mode, according to an exemplary embodiment of the present invention.

FIG. 6 is a flowchart provided to explain a method for providing a widget service in a broadcast receiving apparatus in a manual channel allocation mode. Referring to FIG. 6, the process of providing a widget service in a broadcast receiving apparatus in a manual channel allocation mode comprises displaying a widget list (S610), and scanning channels (S620), and determining whether there are available channels (S630). If it is determined that there are available channels (S630-Y), a list of scanned channels is displayed (S640).

As shown in FIG. 3B, a list of broadcast programs allocated to each channel is displayed on an area 310 of the screen 300. A user selects an available channel by manipulating direction keys or an OK key of a remote controller, and allocates a widget service to the selected channel (S660).

In operation S660, the operation (not shown) of generating a preferred channel either among widget broadcast channels or among widget broadcast channels and general broadcast channels may be performed together with the operation of allocating a widget service. Alternatively, the operation (not shown) of generating a preferred channel among widget broadcast channels or among widget broadcast channels and general broadcast channels may be performed not shown in any step after operation S660 is performed.

A widget service may be allocated to at least one channel of a widget mode according to a given method other than a method by which a user allocates a widget service to a specific channel by selecting an available channel. Alternatively, a widget service may be allocated to a general mode or a cable mode, and thus may be allocated to a channel between general broadcasts or between cable broadcasts. Various methods for allocating a widget service to an available channel may be applied as the given method to the exemplary embodiment of the present invention as described above with reference to FIG. 5. Operations S670 and S680 are the same as operations S540 and S550, and thus descriptions thereof will be omitted.

If it is determined that there is no available channel (S650-N), a virtual channel is generated to allocate a widget service (S650). The virtual channel is not a channel having a specific frequency band received from an external source, but a channel in which a channel with a virtual number is allocated to a widget service. For example, if a CNN broadcast is broadcast over a cable channel 24, virtual channels 24-1, 24-2, 24-3, . . . are generated, and a weather widget may be allocated to a virtual channel 24-1, a news flash may be allocated to a virtual channel 24-2, and a stock news widget may be allocated to a virtual channel 24-3. Accordingly, a user can allocate a widget service to a specific channel even though there is no available channel.

Figure 7:
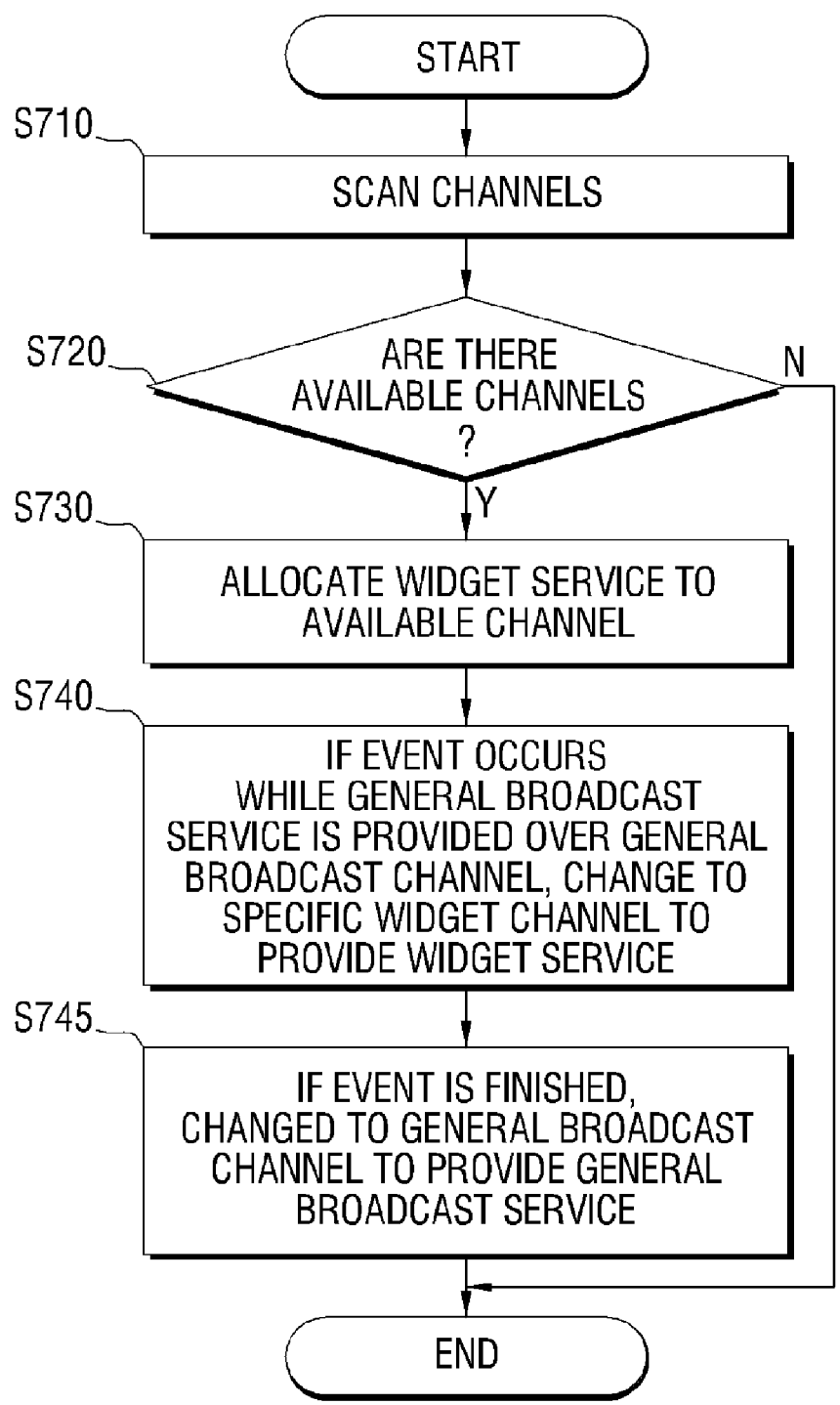
FIG. 7 is a flowchart provided to explain a method for providing a widget service in a broadcast receiving apparatus, according to another exemplary embodiment of the present invention.

The exemplary embodiments of FIGS. 6 and 7 further comprise the process (not shown) of changing a general broadcast channel to a widget broadcast channel or a widget broadcast channel to a general broadcast channel when a preset time arrives. The preset time may be preset using an EPG.

FIG. 7 is a flowchart provided to explain a method for providing a widget service in a broadcast receiving apparatus according to another exemplary embodiment of the present invention. Referring to FIG. 7, operations S710 to S730 are the same as operations S410 to S430, and thus descriptions thereof will be omitted.

If a widget service is allocated to an available channel in operation S730, and if an event occurs, for example, if a commercial broadcast is displayed while a general broadcast service is provided over a general broadcast channel, the general broadcast channel is changed to a widget channel to provide the widget service (S740).

If the event is finished, that is, if the commercial broadcast is finished, the widget broadcast channel is changed back to the general broadcast channel to provide the general broadcast service (S745).

Figure 8:
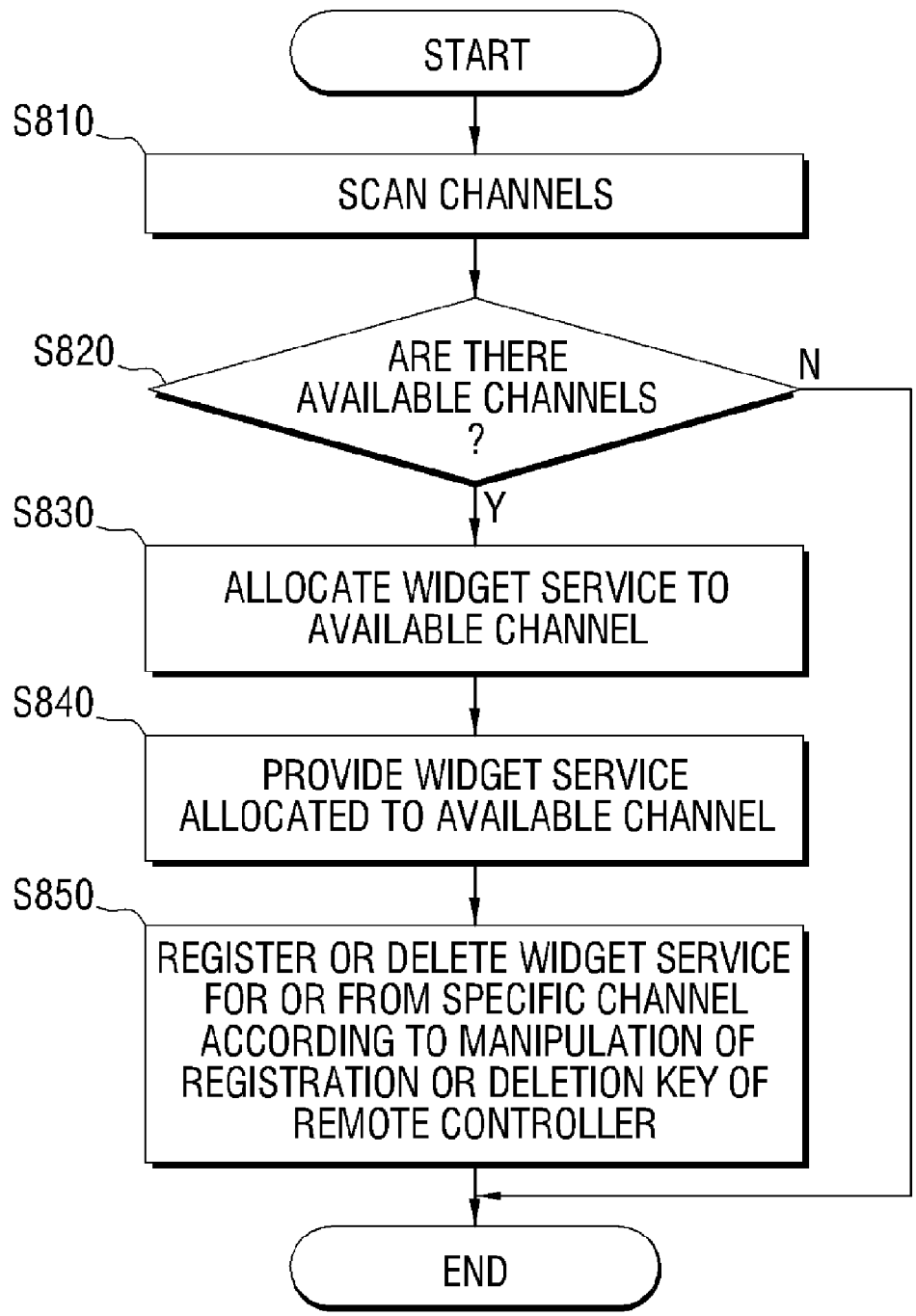
FIG. 8 is a flowchart provided to explain a method for providing a widget service in a broadcast receiving apparatus, according to yet another exemplary embodiment of the present invention.

FIG. 8 is a flowchart provided to explain a method for providing a widget service in a broadcast receiving apparatus according to yet another exemplary embodiment of the present invention. Referring to FIG. 8, operations S810 to S840 are the same as operations S410 to S440 in FIG. 4, and thus descriptions thereof will be omitted.

After a widget service is allocated to an available channel in operation S830, the widget service may be registered for or deleted from a specific channel according to manipulation of a registration or deletion key of a remote controller (S850).

The exemplary embodiments described with reference to FIGS. 7 and 8 may be applied to not only an automatic channel mode but also a manual channel mode.

The exemplary embodiments of FIGS. 7 and 8 further comprise the process (not shown) of changing a general broadcast channel to a widget broadcast channel or a widget broadcast channel to a general broadcast channel when a preset time arrives.

Figure 9:
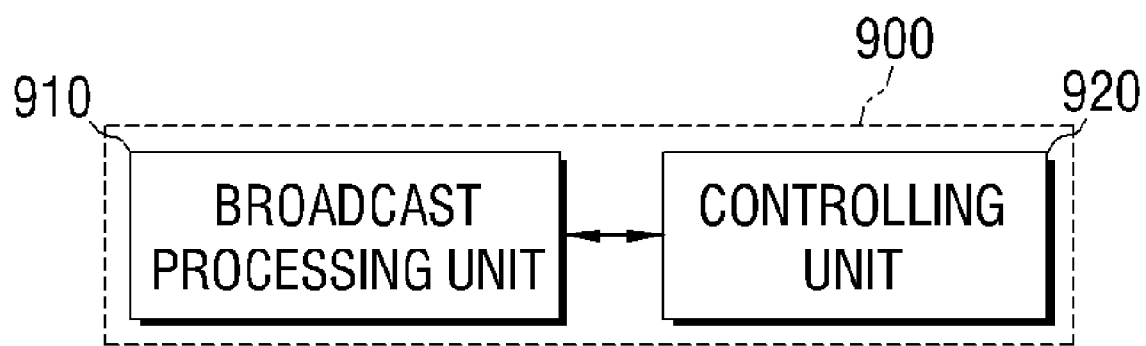
FIG. 9 is a block diagram illustrating a broadcast receiving apparatus according to another exemplary embodiment of the present invention.

FIG. 9 is a block diagram illustrating a broadcast receiving apparatus according to another exemplary embodiment of the present invention. Referring to FIG. 9, a broadcast receiving apparatus 900 comprises a broadcast processing unit 910 and a controlling unit 920.

The broadcast processing unit 910 tunes to a broadcast channel and provides a broadcast service. The broadcast channel may comprise a general broadcast channel and a widget broadcast channel.

If an event occurs while a general broadcast service is provided over a general broadcast channel, the controlling unit 920 changes the general broadcast channel to a widget channel, and provides a widget service over the widget channel, and if the event is finished, the controlling unit 920 changes the widget channel back to the general broadcast channel, and provides the general broadcast service.

The event may be an event in which a commercial broadcast is displayed while a general broadcast service is provided. The event may be an event which occurs after a given time period has elapsed. In this case, a starting time and a finishing time of the event may be preset in advance. The starting time and the finishing time of the event may be preset through an EPG. At a preset starting time, a general broadcast channel is changed to a widget broadcast channel, and after a given time period, a widget broadcast channel is changed to the general broadcast channel. Various events besides the above events may also be applied to the exemplary embodiments of the present invention.

The broadcast processing unit 910 may register information on a channel to which a widget service is allocated with an EPG. The channel information may be all of the information including a specific service such as a starting time and a finishing time of a specific program, a type of commercial broadcast to be inserted, a time at which a commercial broadcast is inserted, a finishing time of a commercial broadcast, a type of a widget service to be inserted instead of a commercial broadcast, and a channel number to which a widget service is allocated.

A widget service instead of a commercial broadcast may be provided using information registered with an EPG of the broadcast receiving apparatus 910 in various situations, for example immediately before, at the same time as, or a given time period after a commercial broadcast is displayed. A general broadcast service is provided after the commercial broadcast is finished.

According to an exemplary embodiment of the present invention described above, if an event occurs while a general broadcast service is provided, a general broadcast channel is changed to a widget channel and thus a widget service of the widget channel is provided. Alternatively, if an event occurs while a widget service is provided, a widget channel providing the widget service is changed to another widget channel corresponding to the event so that the other widget service is provided.

Figure 10:
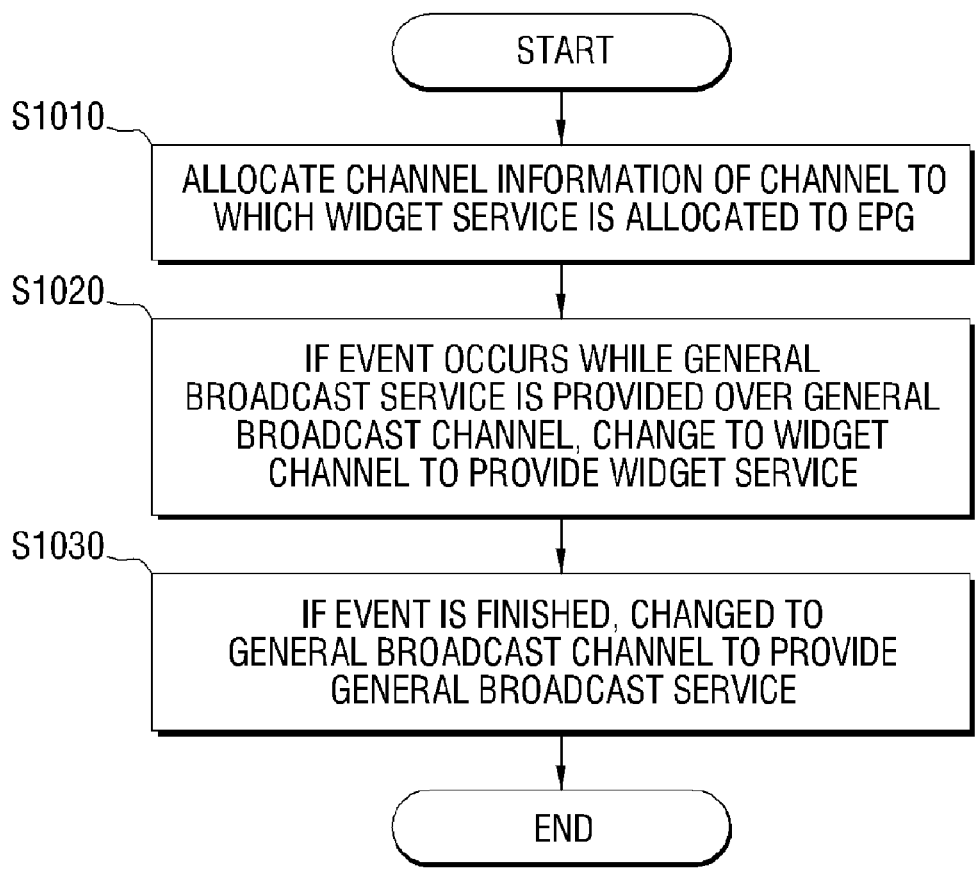
FIG. 10 is a flowchart provided to explain a method for providing a widget service in a broadcast receiving apparatus, according to yet another exemplary embodiment of the present invention.

FIG. 10 is a flowchart provided to explain a method for providing a widget service in a broadcast receiving apparatus according to yet another exemplary embodiment of the present invention. Referring to FIG. 10, the process of providing a widget service in a broadcast receiving apparatus is provided. The controlling unit 920 registers information on a channel to which a widget service is allocated to an EPG (S1010).

If an event occurs while a general broadcast service is provided over a general broadcast channel, the controlling unit 920 changes the general broadcast channel to a widget channel and provides a widget service (S1020), and if the event is finished, the controlling unit 920 changes the widget channel to the general broadcast channel and provides the general broadcast service (S1030).

Figure 11:
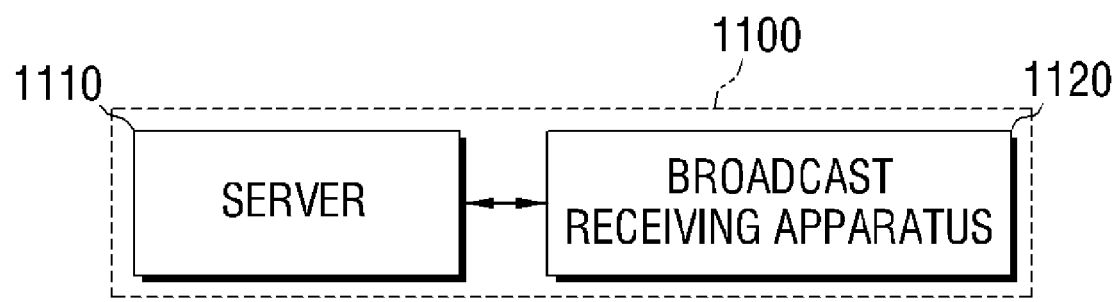
FIG. 11 is a block diagram illustrating a broadcast receiving system according to an exemplary embodiment of the present invention.

FIG. 11 is a block diagram illustrating a broadcast receiving system according to an exemplary embodiment of the present invention. Referring to FIG. 11, a broadcast receiving system 1100 according to an exemplary embodiment of the present invention comprises a server 1110 and a broadcast receiving apparatus 1120. The server 1110 stores widget information. If it is determined that there is an available channel among scanned channels, the broadcast receiving apparatus 1120 allocates a widget service to an available channel and provides the widget service allocated to the channel.

The broadcast receiving apparatus 1120 providing a widget service receives information required to provide the widget service from the server 1110 or a hub site. The operations of the server 1110 and the broadcast receiving apparatus 1120 are the same as described above, and thus descriptions thereof will be omitted.

As described above, a broadcast receiving apparatus may be one of a TV and a settop box. The general TV performs the above operations and provides a widget service, and the settop box mounted on the TV as a subsidiary device may also perform the above operations.

According to the various exemplary embodiments of the present invention, the present invention may be applicable to an analog TV of a rotary method and thus backward compatibility may be provided.

According to various exemplary embodiments of the present invention, a widget service may be allocated to a channel of a TV and provided without hiding the screen of the TV, and a user can use the service with greater convenience.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing a widget service using a media service providing apparatus, comprising:
scanning channels that provide media services therethrough;
determining whether or not there is an available channel among the scanned channels for allocating a widget service;
if it is determined that there is the available channel, allocating the widget service to the available channel; and
providing the widget service using the available channel.

2. The method as claimed in claim 1, further comprising:
if it is determined that there is no available channel, generating a virtual channel and allocating the widget service to the virtual channel.

3. The method as claimed in claim 1, further comprising:
displaying a list of at least one widget service including the widget service on a display screen,
wherein the scanning the channels comprises scanning the channels if one of the at least one widget service is selected.

4. The method as claimed in claim 1, further comprising:
if it is determined that there is at least one available channel, displaying a list of the at least one available channel,
wherein the allocating the widget service to the available channel comprises allocating the widget service to a channel selected from the list.

5. The method as claimed in claim 1, wherein the scanning channels comprises scanning the channels according to at least one of a general mode, a cable mode, a digital television (TV) mode, and a widget mode.

6. The method as claimed in claim 1, wherein the scanning the channels comprises scanning the channels whenever an event occurs or at given time.

7. The method as claimed in claim 1, wherein the allocating the widget service to the available channel comprises automatically allocating the widget service according to a given method.

8. The method as claimed in claim 1, further comprising:
if a widget service is allocated to the available channel, storing information on mapping between the available channel and the widget service.

9. The method as claimed in claim 1, wherein the providing the widget service comprises:
if an event corresponding to the widget service occurs while a general media service is provided over a general channel, changing the general channel to a widget channel corresponding to the available channel and providing the widget service; and
if the event is finished, changing the widget channel to the general channel and providing the general media service.

10. The method as claimed in claim 9, wherein the event comprises an event in which a commercial broadcast is displayed while the general media service is provided.

11. The method as claimed in claim 9, further comprising:
at a time preset using an electronic program guide (EPG), changing the widget channel to the general channel or changing the general channel to the widget channel.

12. The method as claimed in claim 1, further comprising:
registering the widget service to a different channel or deleting the provided widget service from the different channel according to manipulation of a registration or deletion key of a remote controller.

13. The method as claimed in claim 1, wherein the providing the widget service comprises:
displaying a channel number of a widget channel corresponding to the available channel and a channel number of a general channel over which a general media service is provided using different colors on an area of a display screen; and
providing the widget service.

14. The method as claimed in claim 1, further comprising:
generating a preferred channel among widget channels over which the widget service is provided or among the widget channels and general channels over which a general media service is provided.

15. A method for providing a widget service using a media service providing apparatus, comprising:
if an event occurs while a general media service is provided over a general channel, changing the general channel to a widget channel and providing a widget service; and
if the event is finished, changing the widget channel to the general channel and providing the general service.

16. The method as claimed in claim 15, further comprising:
registering information regarding a channel to which the widget service is allocated to an electronic program guide (EPG).

17. The method as claimed in claim 15, wherein the event comprises an event in which a commercial broadcast is displayed while the general media service is provided.

18. The method as claimed in claim 15, wherein the event comprises an event in which a time preset through an electronic program guide (EPG) arrives.

19. A media service providing apparatus, comprising:
a scanning unit which scans channels providing media services therethrough;
a determination unit which determines whether or not there is an available channel among the scanned channels for allocating a widget service;
a controlling unit which allocates a widget service to the available channel and provides the widget service using the available channel if it is determined that there is the available channel.

20. The apparatus as claimed in claim 19, wherein if it is determined that there is no available channel, the controlling unit generates a virtual channel and allocates the widget service to the virtual channel.

21. The apparatus as claimed in claim 19, further comprising:
a first display unit which displays a list of at least one widget service including the widget service on a display screen,
wherein if one of the at least one widget service is selected, the scanning unit scans the channels.

22. The apparatus as claimed in claim 19, further comprising:
a second display unit which, if it is determined that there is at least one available channel, displays a list of the at least one available channel,
wherein the controlling unit allocates the widget service to a channel selected from the list.

23. The apparatus as claimed in claim 19, wherein the scanning unit scans the channels according to one of a general mode, a cable mode, a digital television (TV) mode, and a widget mode.

24. The apparatus as claimed in claim 19, wherein the scanning unit scans the channels whenever an event occurs or at given time.

25. The apparatus as claimed in claim 19, wherein the controlling unit automatically allocates the widget service according to a given method.

26. The apparatus as claimed in claim 19, further comprising:
a storage unit which stores information on mapping between the available channel and the widget service if a widget service is allocated to the available channel.

27. The apparatus as claimed in claim 19,
wherein if an event occurs while a general media service is provided over a general channel, the controlling unit changes the general channel to a widget channel corresponding to the available channel, and provides the widget service, and
wherein if the event is finished, the controlling unit changes the widget channel to the general channel and provides the general media service.

28. The apparatus as claimed in claim 27, wherein the event comprises an event in which a commercial broadcast is displayed while the general media service is provided.

29. The apparatus as claimed in claim 27, wherein the event comprises an event in which a time preset through an electronic program guide (EPG) arrives.

30. The apparatus as claimed in claim 19, wherein the controlling unit registers the provided widget service to a different channel or deletes the provided widget service from the different channel according to manipulation of a registration or deletion key of a remote controller.

31. The apparatus as claimed in claim 19, wherein the controlling unit displays a channel number of a widget channel corresponding to the available channel and a channel number of a general channel over which a general media service is provided using different colors on an area of a display screen and provides the widget service.

32. The apparatus as claimed in claim 19, further comprising:
a preferred channel generation unit which generates a preferred channel among widget channels over which the widget service is provided or among the widget channels and general channels over which a general media service is provided.

33. A media service providing apparatus, comprising:
a media processing unit which tunes to a general channel and provides a general media service; and
a controlling unit which changes the general channel to a widget channel and provides a widget service if an event occurs while the general media service is provided over the general channel, and changes the widget channel to the general channel and provides the general media service if the event is finished.

34. The apparatus as claimed in claim 33, wherein the media processing unit registers information regarding a channel to which the widget service is allocated to an electronic program guide (EPG).

35. The apparatus as claimed in claim 33, wherein the event comprises an event in which a commercial broadcast is displayed while the general media service is provided.

36. The apparatus as claimed in claim 33, wherein the event comprises an event in which a time preset through an electronic program guide (EPG) arrives.

37. A media service providing system, comprising:
a server which stores widget information; and
a media service providing apparatus which allocates a widget service to an available channel and provides the widget service allocated to the available channel if the media service providing apparatus scans channels and determines that there is the available channel among the scanned channels.

38. The system as claimed in claim 37, wherein the media service providing apparatus scans the channels according to at least one of a general mode, a cable mode, a digital television (TV) mode, and a widget mode.

39. The system as claimed in claim 37, wherein the media service providing apparatus scans the channels when an event occurs or at a given time.

40. The system as claimed in claim 37, wherein the media service providing apparatus generates a virtual channel and allocates the widget service to the virtual channel if it is determined that there is no available channel.

41. The system as claimed in claim 37,
wherein if an event occurs while a general media service is provided over a general channel, the media service providing apparatus changes the general channel to a widget channel corresponding to the available channel, and provides the widget service, and
wherein if the event is finished, the media service providing changes the widget channel to the general channel and provides the general media service.

42. The system as claimed in claim 41, wherein the event comprises an event in which a commercial broadcast is displayed while the general media service is provided.

43. The system as claimed in claim 41, wherein the event comprises an event in which a time preset through an electronic program guide (EPG) arrives.

44. The system as claimed in claim 37, wherein the media service providing apparatus registers the widget service to a specific channel or deletes the widget service from the specific channel according to a manipulation of a registration or deletion key of a remote controller.

45. The system as claimed in claim 37, wherein the media service providing apparatus displays a channel number of a widget channel corresponding to the available channel and a channel number of a general channel over which a general media service is provided using different colors on an area of a display screen and provides the widget service.

46. The system as claimed in claim 37, wherein the media service providing apparatus generates a preferred channel among widget channels over which the widget service is provided or among the widget channels and general channels over which a general media service is provided.

* * * * *